(12) United States Patent
Starr

(10) Patent No.: US 7,694,978 B2
(45) Date of Patent: Apr. 13, 2010

(54) GASKET ASSEMBLY AND METHOD OF MANUFACTURE THEREOF

(75) Inventor: George Starr, Fowlerville, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/463,081

(22) Filed: Aug. 8, 2006

(65) Prior Publication Data

US 2008/0036157 A1 Feb. 14, 2008

(51) Int. Cl.
F16J 15/02 (2006.01)
B32B 3/26 (2006.01)
B32B 7/14 (2006.01)

(52) U.S. Cl. .................. 277/645; 277/316; 277/598; 277/650; 277/917; 428/321.1; 428/321.5; 428/316.6; 428/317.1; 156/295; 156/291

(58) Field of Classification Search ............... 277/592, 277/316, 598, 917, 650, 645; 156/295, 291; 428/321.1, 321.5, 316.6, 317.1
See application file for complete search history.

(56) References Cited

U.S. PATENT DOCUMENTS

| | | | | |
|---|---|---|---|---|
| 2,636,297 A | * | 4/1953 | Johnson | 40/638 |
| D175,089 S | * | 7/1955 | Newmark | D24/195 |
| 2,718,691 A | | 9/1955 | Sussenbach | |
| 2,772,903 A | | 12/1956 | Sussenbach | |
| 2,889,922 A | * | 6/1959 | Clarvoe | 206/484 |
| 3,061,895 A | * | 11/1962 | Kleinhans | 277/642 |
| 3,565,247 A | * | 2/1971 | Brochman | 428/40.2 |
| 3,639,137 A | * | 2/1972 | Marinelli | 428/321.5 |
| 3,740,062 A | * | 6/1973 | Robins | 277/592 |
| 3,767,211 A | | 10/1973 | Amphlett | |
| 3,896,969 A | * | 7/1975 | Basile | 222/54 |
| D242,293 S | * | 11/1976 | Panicci | D24/194 |
| 4,273,827 A | * | 6/1981 | Sweeney et al. | 428/316.6 |
| 4,540,183 A | * | 9/1985 | Schneider et al. | 277/312 |
| 4,749,429 A | | 6/1988 | Condon et al. | |
| 4,835,925 A | * | 6/1989 | Hoffmann, Sr. | 52/287.1 |
| 4,962,938 A | | 10/1990 | Cooper | |
| 5,087,492 A | * | 2/1992 | Vallauri et al. | 428/34.9 |
| 5,137,283 A | | 8/1992 | Giarrusso et al. | |
| 5,247,769 A | * | 9/1993 | Becker | 52/506.06 |
| 5,338,590 A | * | 8/1994 | Rodriguez | 428/40.9 |
| 5,540,720 A | * | 7/1996 | Ortega | 606/235 |
| 5,577,314 A | | 11/1996 | Katsuno et al. | |
| 5,727,791 A | | 3/1998 | Weiss et al. | |
| 5,791,654 A | | 8/1998 | Gaines et al. | |
| 5,799,459 A | * | 9/1998 | Covert | 52/518 |
| 5,992,858 A | | 11/1999 | Teaster | |
| 6,357,764 B1 | | 3/2002 | Gaines et al. | |

(Continued)

FOREIGN PATENT DOCUMENTS

JP 56147965 A 11/1981

(Continued)

*Primary Examiner*—Alison K Pickard
(74) *Attorney, Agent, or Firm*—Robert L. Stearns; Dickinson Wright, PLLC

(57) ABSTRACT

A gasket assembly and method of manufacture thereof provides a plurality of discrete, interconnected capsule beads spaced from one another. A sealant material is disposed in the capsule beads, such that when the capsule beads are ruptured under an applied clamping force, the gasket material is released from the capsule beads.

4 Claims, 2 Drawing Sheets

U.S. PATENT DOCUMENTS

| | | |
|---|---|---|
| 6,454,267 B1 | 9/2002 | Gaines et al. |
| 6,454,276 B2 | 9/2002 | Gaines et al. |
| 6,719,293 B1 | 4/2004 | Coles et al. |
| 6,779,800 B2 * | 8/2004 | Udagawa .................... 277/592 |
| 2002/0063395 A1 * | 5/2002 | Klinner et al. .............. 277/592 |
| 2003/0098546 A1 | 5/2003 | Beyssac et al. |
| 2004/0212157 A1 | 10/2004 | Bohringer et al. |
| 2004/0262850 A1 * | 12/2004 | Matsushita .................. 277/592 |
| 2005/0067787 A1 | 3/2005 | Kim |
| 2005/0104438 A1 * | 5/2005 | Petchel et al. .............. 301/5.21 |
| 2007/0110345 A1 * | 5/2007 | Hsu et al. ..................... 384/45 |

FOREIGN PATENT DOCUMENTS

| | | |
|---|---|---|
| WO | WO 95/29575 | 11/1995 |

* cited by examiner

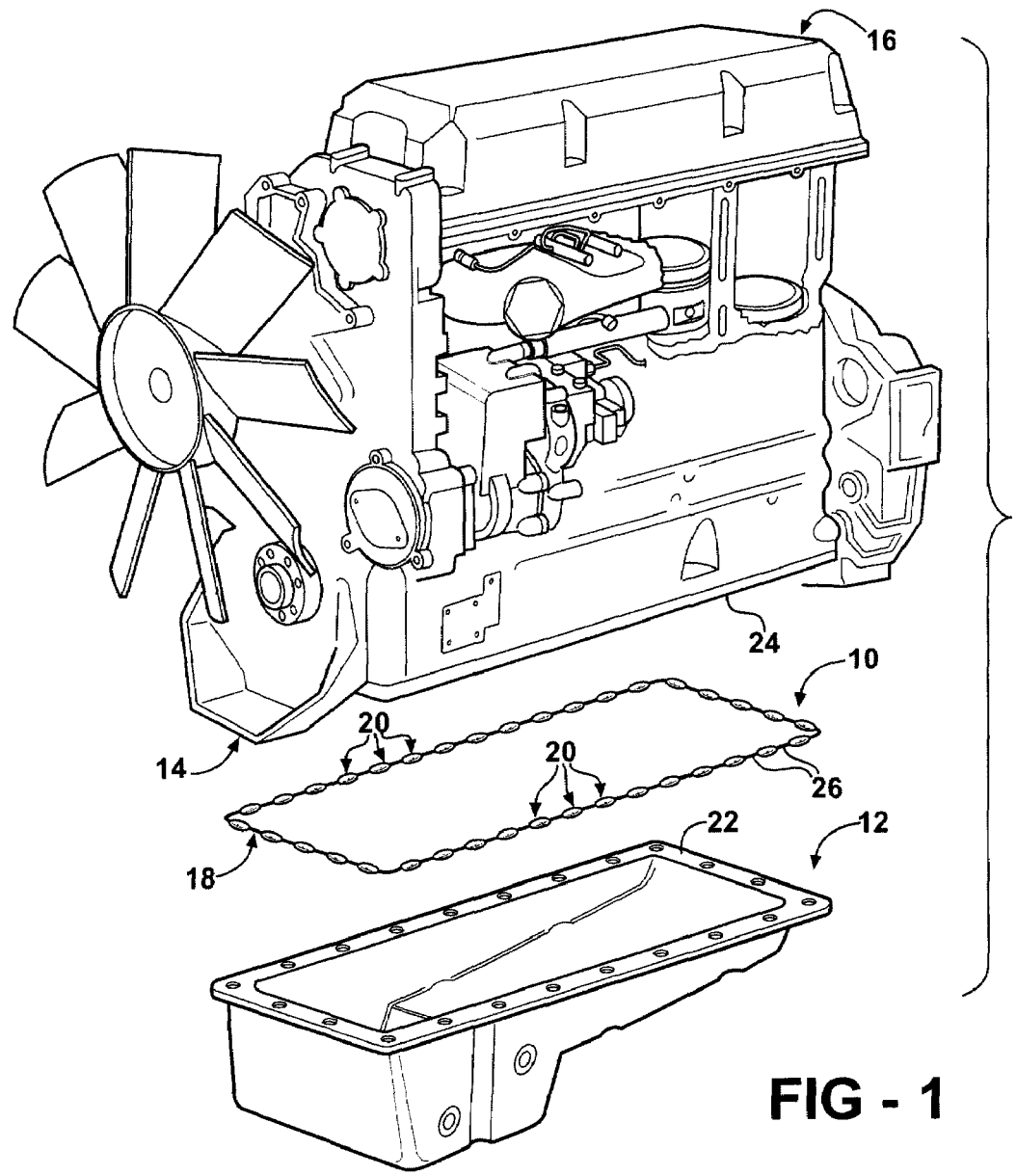
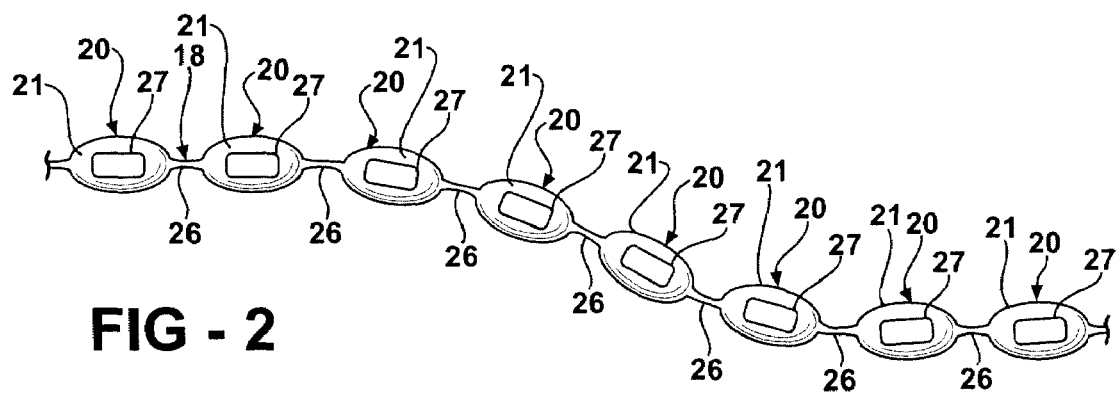
FIG - 1
FIG - 2

GASKET ASSEMBLY AND METHOD OF MANUFACTURE THEREOF

BACKGROUND OF THE INVENTION

1. Field of the Invention

This invention relates generally to gaskets and their method of manufacture.

2. Related Art

Gaskets are commonly used to create a seal between opposing surfaces, and are particularly useful in internal combustion engines and various other vehicle components, such as pumps. To ensure a good seal between the opposite surfaces, commonly a sealant material and a separate gasket are clamped in combination with one another between the surfaces. Typically, the sealant material is applied directly to at least one of the opposite surfaces, and/or to at least one side of the gasket. Though this can result in creating a good seal, it generally adds time and expense to the assembly process.

SUMMARY OF THE INVENTION

A gasket assembly has a plurality of discrete, interconnected capsules defining enclosed spaces isolated by a wall of the capsules. A sealant material is disposed in the enclosed spaces of at least some of the capsules. The walls of the capsules are rupturable in response to an applied clamping force to burst the capsules and release the sealant material from the capsules.

Another aspect of the invention provides a method of manufacturing a gasket assembly. The method of manufacture includes forming a plurality of discrete capsules from a rupturable membrane. Next, disposing a sealant material within the capsules, and further, interconnecting the capsules to one another.

BRIEF DESCRIPTION OF THE DRAWINGS

These and other features and advantages of the present invention will become more readily appreciated when considered in connection with the following detailed description and appended drawings, wherein:

FIG. 1 is an exploded perspective view showing a gasket assembly according to one presently preferred embodiment of the invention located for assembly between an engine block and an oil pan of an internal combustion engine;

FIG. 2 is an enlarged partial plan view of an open ended string section cut from the gasket assembly of FIG. 1;

DETAILED DESCRIPTION OF THE PREFERRED EMBODIMENTS

Figure 3:
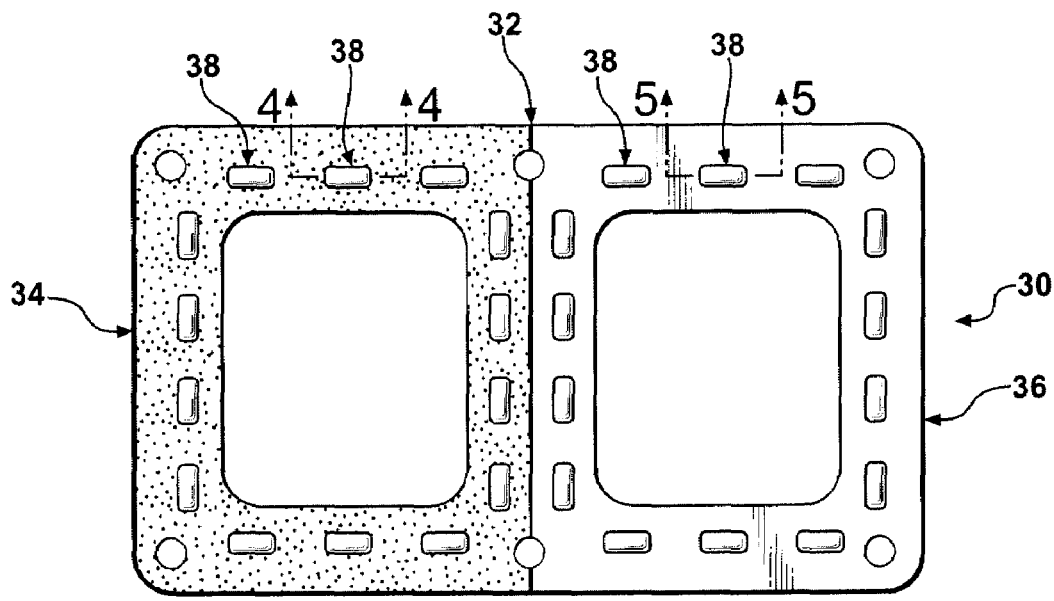
FIG. 3 is a plan view of a gasket assembly constructed according to another embodiment of the invention.

Referring in more detail to the drawings, FIG. 1 illustrates a gasket assembly 10 according to one presently preferred embodiment of the invention positioned for assembly between opposing surfaces, for example, between an oil pan 12 and an engine block 14 of an internal combustion engine 16. The gasket assembly 10 has a plurality of discrete capsules, referred to here after as capsule beads 20, interconnected to one another. Each of the capsule beads 20 define enclosed spaces isolated by walls 21, wherein sealant material is disposed within the spaces. The capsule beads 20 are represented here, by way of example and without limitations, as being supported generally equidistant from one another by a body 18 arranged in a closed loop. In assembly, as the oil pan 12 is attached to the engine block 14, such as by threaded fasteners, the beads 20 of the gasket assembly 10 are compressed under a clamping force between opposite surfaces or flanges 22, 24. The capsule beads 20 rupture in response to the clamping force, and thus, the capsule beads 20 burst to release the sealant material, such as a liquid sealant, for example, from the beads 20 to uniformly coat the surface area between the mating flanges 22, 24, thereby establishing a uniform, reliable seal between the flanges 22, 24.

The gasket assembly 10, though represented in FIG. 1 as a continuous flexible string loop of discrete capsule beads 20 interconnected to one another by link segments 26, could be formed as an open ended string of interconnected capsule beads 20, such as shown in FIG. 2, wherein a section has been cut from the gasket 10 shown in FIG. 1, for example. If formed as a closed loop, the loop is constructed having a predetermined circumference such that it can be manipulated to conform with the peripheral shape of the mating surfaces being sealed. Otherwise, if constructed in an open ended string, one or more strings of capsule beads 20, depending on their length, can be used to span the surfaces being sealed.

As shown in FIG. 2, to facilitate maintaining the gasket assembly 10 in position between the flanges 22, 24 during assembly, an adhesive 27 could be applied to an outer surface of the walls 21. The adhesive 27 could be applied directly to the outer surface during manufacture of the gasket assembly 10, or any time thereafter. If applied during manufacture, release paper (not shown) or the like could be applied over the adhesive to allow the gasket 10 to be readily handled and/or stored for future use. Accordingly, the adhesive 27 can be selectively exposed by removing the release paper during assembly, thereby assisting in maintaining the gasket in the desired location until the flanges 22, 24 are attached to one another.

The capsule beads 20 are shown interconnected to one another by the flexible link segments 26, with an outer surface of the beads 20 extending laterally outwardly from the segments 26. The flexible link segments 26 allow the gasket assembly 10 to be flexed and manipulated to conform to any desired shape. Accordingly, the gasket assembly 10 can be used universally for applications having a variety of differently shaped peripheral surfaces to be sealed against one another. As mentioned, wherein an application has a peripheral circumference or other area to be sealed that is different in dimension than the circumference of the closed loop gasket assembly 10, the closed loop could be transformed to an open string by cutting one or more of the link segments 26, preferably without rupturing any of the beads 20. Accordingly, the resulting open ended string or string segments of the gasket assembly 10 can be used to seal surfaces having different lengths or perimeters than that of the originally closed loop.

The capsule beads 20 and link segments 26 of the gasket assembly 10 are shown in FIGS. 1 and 2, by way of example and without limitations, as being constructed as one piece from any suitable gasket material, such as, silicone, polytetraflouroethylene (PTFE), polyester, or natural rubber, for example. Accordingly, the material used to form the capsule beads 20 and links 26 can coact with the sealant material released from the beads 20 to facilitate creating the seal between the opposing surfaces.

The capsule beads 20 can be spaced laterally from one another and sized to meet the sealing requirements for specific applications. As such, the amount and location of the sealant material encapsulated within the beads 20 and dispersed in use can be controlled to maximize the integrity of the seal formed, while minimizing waste of sealant material. It should be recognized that the shape, size and location of the separate capsule beads of the gasket assembly 10 can be varied to meet the specific sealing requirements of the application.

In addition to being able to vary the size and shape of the capsule beads 20, the type of sealant material disposed in each bead 20 can be varied. As such, one section of the gasket assembly 10 may be constructed with capsule beads 20 having one type of sealant material best suited for one area being sealed, while another portion of the gasket assembly 10 may have capsule beads 20 filled with a different type of sealant material best suited for another area being sealed. Additionally, it should be recognized that sealant materials having reactive ingredients, such as epoxies, for example, could have the reactive ingredients contained in their nonreactive states in adjacent capsule beads 20. For example, one capsule bead 20 could contain a hardener of an epoxy, and an adjacent capsule bead 20 could contain a resin reactive with the hardener. As such, upon the adjacent capsule beads 20 being ruptured, the resin and hardener can mix and react to create a sealed joint between the opposing surfaces.

A gasket assembly 30 constructed according to another embodiment of the invention is shown in FIG. 3. The gasket assembly 30 has a generally flat body 32 fabricated from any suitable gasket material, such as, paper based material, rubber, cork, silicone and metal, for example, or the body 32 could be fabricated using one or more of the aforementioned materials, as desired. For example, one section 34 of the gasket body 32 could be fabricated from rubber, while another section 36 could be fabricated from metal. Additionally, at least a portion of the body 32 (not shown) could have raised ribs or the like, such as are commonly formed via a stamping or embossing process, for example.

Figure 4:
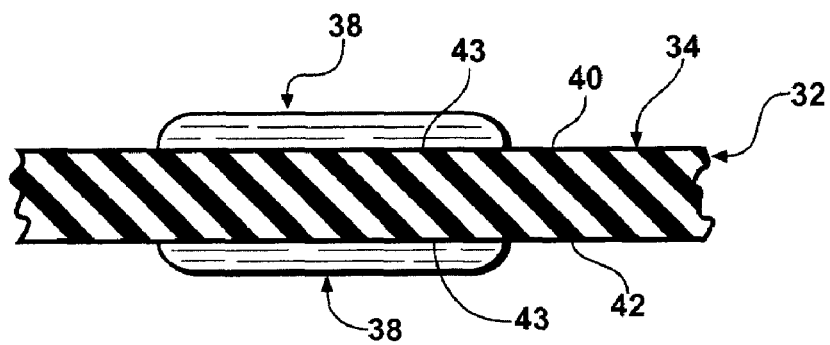
FIG. 4 is a cross-sectional view taken along line 4-4 of FIG. 3.

The gasket assembly 30 has a plurality of discrete, interconnected capsule beads 38 having walls defining spaces for containing sealant material supported by the body 32. As described above, the capsule beads 38 are spaced and sized to provide the desired disbursement of the sealant material. As shown in FIG. 4, the capsule beads 38 can be attached to opposite faces 40, 42 of the body 32, such as through the use of an adhesive layer 43, for example, such that the beads extend laterally outwardly from the faces 40, 42. The beads 38 are represented here, by way of example and without limitations, as being opposite one another, though they could be arranged in staggered relation to one another. As describe above, the capsule beads 38 can encapsulate different types of sealant material, such as a liquid sealant, for example, to best achieve a good, reliable seal. For example, the capsule beads 38 in the metal section 36 of the gasket assembly 30 could have one type of liquid sealant, while the capsule beads 38 in the rubber section 34 of the gasket assembly 30 could have a different type of liquid sealant. Additionally, it should be recognized that the capsule beads 38 attached to one face 40 could have a different liquid sealant than the capsule beads 38 attached to the opposite face 42.

Figure 5:
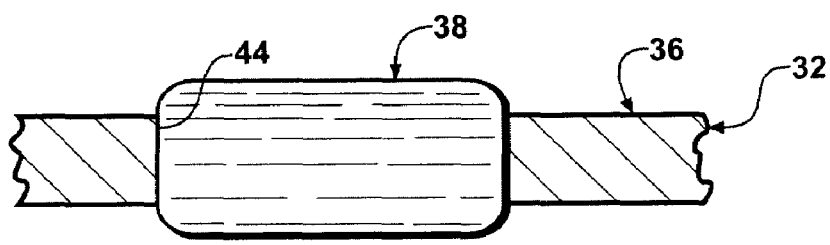
FIG. 5 is a cross-sectional view taken along line 5-5 of FIG. 3.

As shown in FIG. 5, the body 32 could have through openings 44 for receipt of the capsule beads 38, rather than attaching the capsule beads 38 to the faces 40, 42. The through openings 44 can be sized to snuggly receive the capsule beads 38, such that they are retained therein, and preferably extend outwardly therefrom, or an adhesive could be used to facilitate their retention. Accordingly, one capsule bead can be used to disperse sealant material on the opposite faces 40, 42 upon being ruptured.

With the capsule beads 38 extending laterally outwardly from the faces 40, 42, the beads can be compressed prior to the body 32, thereby causing the capsule beads 38 to rupture prior to any significant compression of the body 32, and preferably before the opposite surfaces being sealed engage the body 32. Accordingly, the sealant material dispersed from the capsule beads 38 is generally free to flow uniformly over the faces 40, 42 prior to their being engaged by the opposite surfaces being sealed, thereby facilitating creating a reliable and uniform seal.

Obviously, many modifications and variations of the present invention are possible in light of the above teachings. It is, therefore, to be understood that within the scope of the appended claims, the invention may be practiced otherwise than as specifically described.

What is claimed is:

1. A gasket assembly, comprising:
   a plurality of discrete, capsules defining enclosed spaces isolated by a wall of said capsules;
   a sealant material disposed in said spaces of at least some of said capsules; and
   wherein said walls of said capsules are rupturable in response to an applied clamping force to burst said capsules and release said sealant material from said capsules, said capsules being constructed from a single material having the shape of ellipsoids and being interconnected by link segments constructed from a single material forming a string of said capsules, said string being uniformly flexible in all directions to conform to a plurality of peripheral shapes.

2. The gasket assembly of claim 1 wherein said string of capsules forms a closed loop which can be flexed into a plurality of peripheral shapes.

3. The gasket assembly of claim 1 wherein one of said capsules encapsulates one kind of said liquid sealant and another of said capsules encapsulates a different kind of said liquid sealant.

4. The gasket assembly of claim 1 wherein said capsules and said link segments are constructed from the same material.

* * * * *